UNITED STATES PATENT OFFICE.

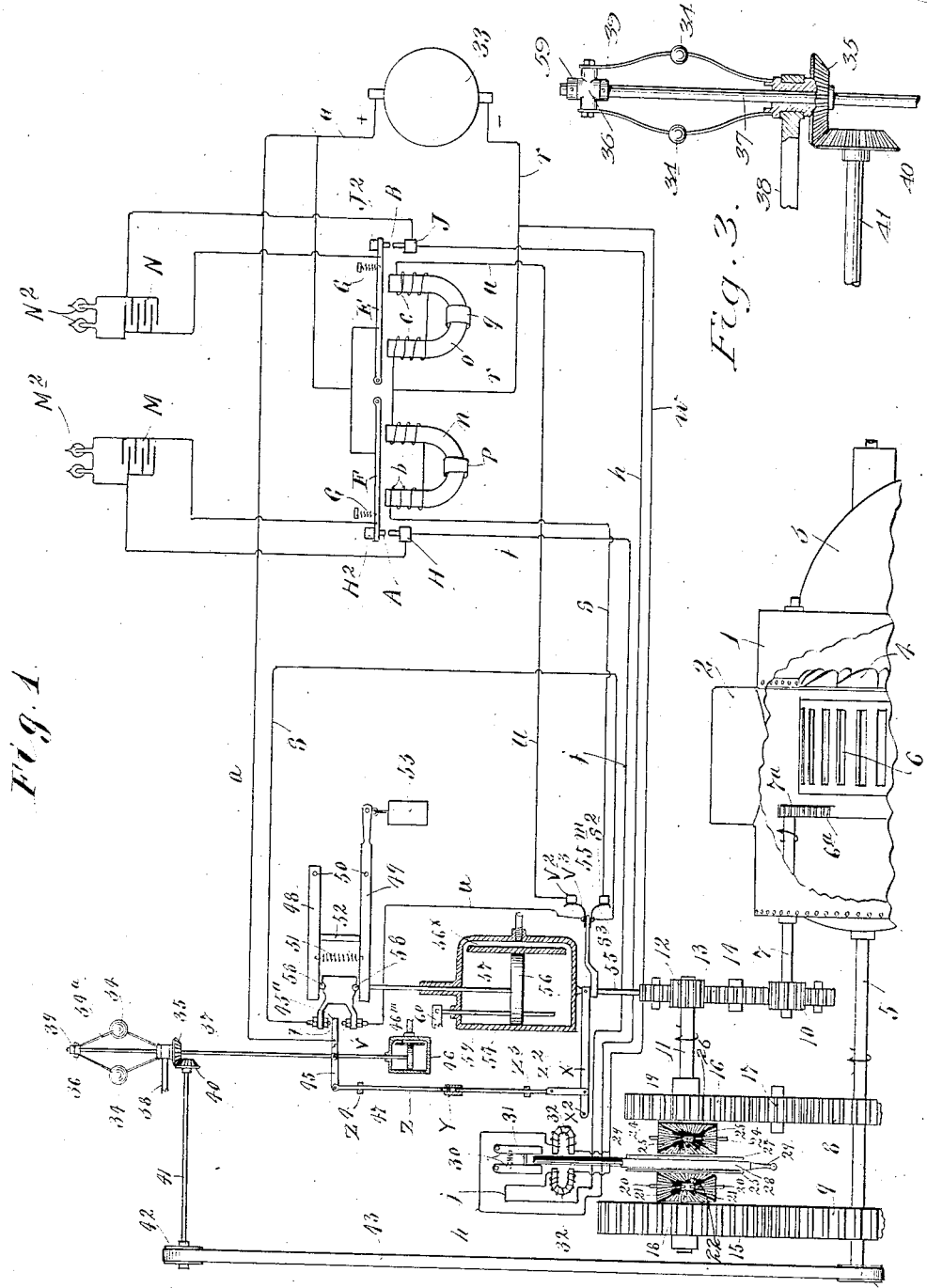

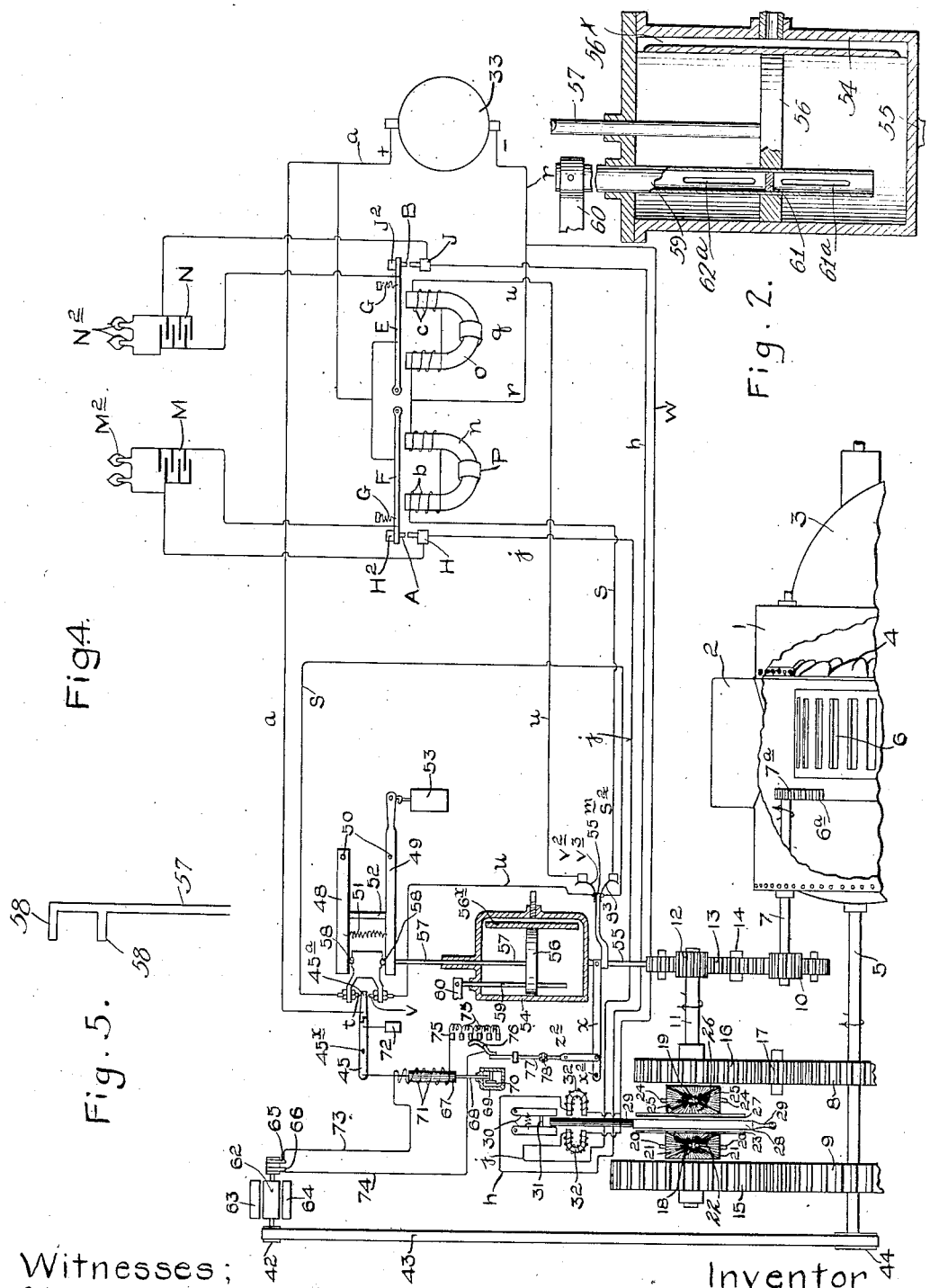
J. PEARSON.
WATER WHEEL GOVERNOR.
APPLICATION FILED MAR. 19, 1909.
1,129,830.
Patented Feb. 23, 1915.
2 SHEETS—SHEET 2.
Witnesses;
H. A. Hillgren,
E. C. Skinkle
Inventor
John Pearson
By his attorneys
Williamson & Merchant

JOHN PEARSON, OF SOMERSET, WISCONSIN, ASSIGNOR OF ONE-HALF TO JAMES F. WILLIAMSON, OF MINNEAPOLIS, MINNESOTA.

WATER-WHEEL GOVERNOR.

1,129,830. Specification of Letters Patent. Patented Feb. 23, 1915.

Application filed March 19, 1909. Serial No. 484,454.

*To all whom it may concern:*

Be it known that I, JOHN PEARSON, a citizen of the United States, residing at Somerset, in the county of St. Croix and State of Wisconsin, have invented certain new and useful Improvements in Water-Wheel Governors; and I do hereby declare the following to be a full, clear, and exact description of the invention, such as will enable others skilled in the art to which it appertains to make and use the same.

My present invention is in the nature of an improvement of the so-called water wheel governor disclosed and broadly claimed in my prior Patent No. 887,223, issued of date May 12, 1908, and has for its object to simplify and generally improve the same.

The following remarks, made in the introductory part of the specification of said prior patent apply also to the present application.

The invention has been particularly designed to meet the requirements of efficient speed regulation of water wheels. Many of the advantages derived from the application of my improved speed controller to water wheels, also result from the application thereof to other motors, but for the purposes of clearness and definiteness, the following comments and illustrations are made in respect to the use of the improved governor in connection with a water wheel.

With a given head of water, a predetermined desired speed of a water wheel, under changing working loads, is maintained by a regulation of the water supplied to the wheel; and for this purpose an adjustable gate or inlet valve (which constitutes the speed controlling element of the water motor) is commonly provided. To render the power of the water wheel available to move the water wheel gate it has also been customary to employ a reversible so-called "differential" or "dynamometer gearing", which gearing usually involves a clutch or friction device by which the gearing is thrown into and out of action, directly or indirectly, by water wheel driven centrifugal balls or weights. A clutch or friction device in such arrangement requires considerable power to operate it and, hence, centrifugal balls or weights of very considerable size have necessarily been provided.

Heavy centrifugal balls or weights do not respond quickly to changes in speed, and for this reason the governors or speed controllers hitherto provided for the regulation of water wheels have not met the requirements of the service. It has been found that in a speed controlling mechanism of this kind including heavy balls or weights, if the working load be suddenly and materially increased, that the said balls or weights will not respond quickly and the opening movement of the gate will not be started as quickly as it should, and consequently, there will be a material reduction of the speed of the water wheel. Again, if the working load be suddenly and materially increased, the heavy centrifugal balls or weights will be too slow in their movement, and consequently the opening movement of the gate will be delayed too long, with the obvious result that in this instance also the speed of the water wheel will be materially reduced.

In the present application, as in the prior patent, I am able to employ very light fly-balls in combination with floating electrical contacts; and these floating contacts actuate the relay contacts and the relay contacts control the current for the friction brake magnets. This arrangement makes it possible and highly practicable to use very small and light centrifugal balls or weights, running at very high speed. In fact, a very small and very sensitive "tachometer" such as that known to the trade as the Shaeffer and Budenberg tachometer, which is extremely sensitive to speed changes can be advantageously employed. With this electrical relay, the current used in the primary and floating contacts may be extremely small, in fact, so small that sparks produced between the floating contacts are scarcely perceptible to the naked eye, while the current used in the friction brake magnets may be relatively very strong, so that those magnets will be sufficiently powerful to throw into action the gearing or other mechanism used to adjust the speed controlling element of the motor. I also provide an improved device which I term an "anti-racing device" which is operative under initial movements of the gearing, or mechanism for adjusting the speed controlling element of the motor, to break the controlling circuit of the electrical relay, and thus prevent excessive movements of the power controlling element of the motor and the consequent "racing" of the motor.

In applying my improved speed controlling mechanism to a water wheel, I preferably employ a reversible differential gearing for rendering the power of the water wheel available to adjust the power controlling element, to-wit, the "gate" thereof. This differential gearing also preferably includes or is thrown into and out of action by a friction brake, which friction brake is arranged to be actuated by the relatively powerful brake magnets. The very small and sensitive centrifugal balls or weights which control the floating contacts are driven from the water wheel and, consequently, are, of course, subject to changes in speed thereof.

In the accompanying drawings which illustrate the invention applied to a water wheel, like characters indicate like parts throughout the several views.

Referring to the drawings, Figure 1 is a diagrammatic view in elevation, showing the improved speed controlling mechanism applied to a turbine water wheel of standard construction; Fig. 2 is a detail view partly in elevation and partly in vertical section showing, on a larger scale than Fig. 1, the so-called anti-racing device in the form of a dash pot and piston connection between a part which is connected for movement with the gate of the water wheel, and certain of the primary contact holders of the electrical relay; and Fig. 3 is a detail view partly in elevation and partly in vertical section, showing on a larger scale than in Fig. 1 the centrifugally actuated water wheel driven governor balls or weights; Fig. 4 is a diagrammatic view showing the improved speed controlling mechanism in modified form applied to a turbine water wheel of standard construction; and Fig. 5 is a detail view in side elevation, showing the piston rod of a so-called anti-racing device.

The turbine water wheel, to which my invention is shown as applied, is of standard construction, and of the parts thereof it is only desirable to note the casing 1, having an inlet 2 and an outlet 3; the water wheel 4, which carries a driving shaft 5; and the gate or valve 6 connected by a gear segment 6ª and pinion 7ª to the gate shaft 7, by means of which it is oscillated, in one direction to open the inlet passage, and in the other direction to close said inlet passage. The wheel shaft 5 carries a spur gear 8 and a larger spur gear 9. On the gate shaft 7 is a spur pinion 10. The power of the water wheel may, of course, be transmitted from the main shaft 5, through pulleys and belts or other devices, not shown, but which may be of the usual or any suitable construction.

Power generated by the water wheel is utilized to move the gate 6, and to this end, the wheel shaft 5 is connected to the gate shaft 7, through a reversible differential gearing, preferably constructed as follows: The numeral 11 indicates a counter shaft journaled in suitable bearings (not shown) and provided, preferably near one end, with a spur pinion 12. The numeral 13 indicates a vertically movable rack that meshes with the pinions 10 and 12 and is guided for endwise sliding movements by suitable keepers 14. Loosely mounted on the shaft 11 is a large spur gear 15 that meshes with the large gear 9 on the wheel shaft 5. Also journaled on the shaft 11 is a spur gear 16 that alines with the gear 8 on the wheel shaft 5. The numeral 17 indicates an intermediate spur pinion that meshes with said two gears 8 and 16 and is journaled in suitable bearings (not shown). The gear 15 carries a bevel gear 18 and the gear 16 carries a bevel gear 19. The countershaft 11, adjacent to the bevel gear 18, is provided with one or more radially projecting studs 20 upon which are journaled bevel pinions 21 that mesh with said bevel gear 18. The numeral 22 indicates a bevel gear that is loosely journaled on the counter shaft 11 and meshes with the pinions 21 and is provided with or secured to a projecting friction disk or flange 23. Adjacent to the bevel gear 19 the counter shaft 11 is provided with one or more radially projecting studs 24 on which are mounted bevel pinions 25 that mesh with said gear 19. Journaled on said counter shaft and meshing with said pinions 25, is a bevel gear 26 that is secured to or provided with a projecting friction disk or flange 27. The two friction disks 23 and 27 are but slightly spaced apart, and working between the same is a non-rotary friction brake or plate 28. This friction brake, as shown, is mounted for lateral movement into engagement with either of the two friction disks, and it is supported and given such movements, by a brake lever 29, pivoted at its lower end and free to vibrate at its upuper end. Said brake lever 29 is normally held in its central or intermediate position, with the friction brake 28 out of engagement with both of said friction disks, by means of a centering device preferably in the form of a pair of pivoted arms 30 that are normally spring pressed against an intermediate stop 31, and the depending ends of which embrace the free upper end of said brake lever 29. On each side of the free end of the brake lever 29 is one of a pair of the brake magnets 32, above referred to and hereinafter described in detail. The upper end of the brake lever 29, or a part thereof, acts as an armature, and is adapted to be drawn in one direction or the other, from its normal position, by whichever of the two magnets 32 is energized.

*Operation of differential gate actuating gear.*—We will assume, that the water wheel 4 and shaft 5 are running in the direction of the arrow marked thereon in Fig. 1, and that the gate 6 is closed by rotary movement of the shaft 7, in the direction of the arrow marked on said shaft 7, and is opened, of course, by a reverse movement of said shaft 7. When the brake 28 is in its intermediate or idle position shown in Fig. 1, the two friction disks 23 and 27, being then free from said brake, are freely rotated in reverse directions and the counter shaft 11 will then remain stationary, because the parts which move on said counter shaft move in different directions. When the right hand magnet 32 is energized, the brake 28 is thrown against the right hand friction disk 27 so that the movements of the latter are stopped or retarded, thereby causing the counter shaft 11 to be rotated in the direction of the arrow marked thereon, and thereby lowering the rack 13 and rotating the gate 6 in the direction of the arrow marked on its shaft 7, to or toward its closed position. When the left hand magnet 32 is energized, the brake lever 29 is drawn toward the left, thereby throwing the brake 28 into frictional contact with the friction disk 23 and thereby stopping or retarding the rotation of the bevel gear 22. When the motion of the bevel gear 22 is stopped or retarded, the counter shaft 11 will be rotated in the direction reverse to that indicated by the arrow marked thereon, the rack 13 will be raised and the gate 6 will be moved to or toward its wide open position.

The numeral 33 indicates a direct current generator of standard or any suitable construction. The engagement of the primary floating contacts is regulated by a small centrifugal governor which, in one way or another, is driven from and whose speed is dependent upon that of the water wheel 4. Of the parts of this centrifugal governor 34$^a$ indicates a pair of resilient links that carry very small balls 34 and connect the hub of the gear 35 to a collar 36, through which gear and collar a vertical shaft 37 is passed. The gear 35 is journaled in a fixed bearing 38 and is held against endwise movement. The shaft 37 is free to slide through the gear 35, but is provided with fixed collars 39 that cause it to move vertically with the sleeve 36, under the action of centrifugal force of the balls 34. The gear 35 meshes with a gear 40 of a shaft 41, which shaft is journaled in suitable bearings (not shown) and is provided with a pulley 42. A belt 43 runs over the pulley 42 and over a pulley 44 on the water wheel shaft 5, and thereby transmits motion from the water wheel to the ball carrying shaft 37. The lower end of the vertically movable non-rotary shaft 37 is pivotally connected to the intermediate portion of a pivoted contact holder or lever 45.

46—47 indicates a dash pot and piston, the stem of the latter being connected to the shaft 37 and serving to prevent the balls 34 and the contact lever 45 from fluttering. 46$^m$ indicates a by-pass on said dash pot. The contact lever 45 has an insulated free end 45$^a$ that is electrically connected to a wire $a$ which, as shown, is connected to the positive side of the generator 33. This lever end 45$^a$ constitutes one of the three floating contacts.

48 and 49 indicate centering levers or holders that are pivoted at 50. These centering levers are yieldingly connected, by a light coiled spring 51, that normally holds both thereof against an interposed fixed stop 52. As shown, the lower lever 49 is counter balanced by a weight 53. The purpose of the spring 51 is to yieldingly hold said levers 48 and 49 against the said stop 52; but this same result might be accomplished solely by the action of gravity.

Of the parts of the anti-racing device, the numeral 54 indicates a dash pot that is rigidly connected, as shown, by a stem 55, to the upper end of the rack 13. Working loosely within the dash pot 54 is a piston 56, the rod 57 of which is provided, at its upper end, with rollers or lateral projections 58 that engage one with the under surface of the upper lever 48, and the other with the upper surface of the lower lever 49. The weight 53 should be heavy enough to counter balance, not only the lever 49, but also the piston 56 and its stem. With this arrangement, if the piston rod 57 moves upward, the lever 48 will be raised, and if said piston rod moves downward, lever 49 will be lowered.

56$^x$ indicates a by-pass for making piston 56 work easier or harder.

59 indicates a tubular pipe valve that is rigidly supported at its upper end by suitable fixed brackets 60. This pipe valve depends into the dash pot 54 and works through a perforation in the piston 56, as best shown in Fig. 2. At its intermediate portion, the pipe valve 59 is provided with a partition or plug 61 and above and below said partition it is provided with vertical slots 62$^a$—61$^a$. The partition 61 is so located that when the piston 56 stands in its intermediate position, shown in Fig. 2, no oil or other liquid contained in the dash pot 54 can go through said pipe valve; but if the piston moves up or down, the oil can go through the slots 61$^a$ or 62 and through the piston, thereby allowing the piston to move more freely, as will hereinafter more fully appear. Preferably, the pipe valve 59 is open at both ends. There should, of course, always be some leakage between the piston 56 and the dash pot 54 and between said piston and the exterior of said pipe valve, so that the said piston can not become locked or blocked in its intermediate position, by liquid caged in the dash pot. Also, there should be leakage between the upper head of the dash pot 54 and said rod 57 and pipe 59.

Describing now the electrical relay, $b$ and $c$ indicate magnetic windings of the electrical relay. Winding $b$ is energized from floating contact $t$, through wire $s$; and winding $c$ is energized from floating contact $v$, through wire $u$, and the current returns to the negative pole of generator 33 through wire $r$. The current for floating contact $45^a$ comes from the positive side of generator 33, through wire $a$. With this arrangement, the upward movement of the lever or contact holder 45 will bring the intermediate floating contact $45^a$ into engagement with the upper floating contact $t$, and downward movement of said lever or holder will bring said contact $45^a$ into engagement with the lower floating contact $v$. As shown, the inner terminals of the coil of the brake-actuating magnet 32 are connected, by a wire $w$, and, hence, to the negative terminals of the generator 33. The outer terminals of the coils of the right and left hand brake actuating magnet 32 are connected by wires $h$ and $j$, respectively, to fixed contacts J and H. The said contacts H and J are located in close proximity to the upper ends of the cores $n$ and $o$, respectively. Located close to but just above the fixed contacts H and J, respectively, are similar contacts A and B. These two contacts A B are mounted on the armature levers F and E.

E and F are armature levers pivoted at their inner ends with the free ends subject, respectively, to the magnet cores $o$ and $n$, and adapted to be moved upward by springs G to open the circuit, respectively, between the contacts B—J and A—H. The parts $45^a$—$t$—$v$, as already noted, constitute the floating contacts, and it should be here stated that the parts A H B J constitute a group of secondary contacts. On the cores $n$ and $o$ are located two solid copper rings P and $q$. If the small fluttering caused by the governor balls 34, and thence by the lever 45 and contact $45^a$, is more than the dash pot 46 can take care of, then these copper rings will stop entirely the fluttering of the relay armatures F and E, by the heavy eddy currents set up in these rings when lever 45 is fluttering. Consequently, the relay armatures can be retarded as much as is necessary by rings P and $q$, and also when copper rings P and $q$ are on the cores, it reduces the spark at the floating contacts $45^a$—$t$—$v$. Both retarding the suddenness of the relay armatures F and E, and reducing the spark at contacts $45^a$—$t$—$v$, is very important. $H^2$ and $J^2$ are stops for armature levers F and E.

M and N are condensers. Condenser M connects across contacts A—H. Condenser N connects across contacts B—J. Across condenser M, is connected in series, two 110 volt incandescent lamps $M^2$. These are used to take up the kick of the brake magnet coil and to help the condenser. Across condenser N are also connected two kicking lamps $N^2$, for the same purpose as across condenser M. They help to reduce the spark at H—A and J—B. The condensers N and M take up the arc across the said contacts A—H and B—J and cause the magnets 32 to release armature and lever 29 more quickly, thereby stopping the gate from over-travel due to arcing at contacts A—H B—J. In practice I have found that the condensers serve to keep the said contacts clean, so that they will always make good contact and will not wear out so fast, as when said condensers are not employed.

$V^3$ and $V^2$, also $S^3$ and $S^2$ are cut-out contacts actuated by the gate movement, through the carrier or support $55^m$, which is bolted solid to rack 13. These are adjusted so that $V^3$ and $V^2$ cut the governor out of action when the gate has been closed to its proper position for normal speed at friction load; and this is important when operating with alternators in parallel. Also cut-out contacts $S^3$ and $S^2$ can be set so that the governor cannot open the gate too far; and this is sometimes useful when operating alternators, because the alternator may not be able to stand all the power of the water wheel and otherwise would burn out. Cutting the governor out at friction load gate opening, sometimes prevents the bursting of the penstock or flume on high heads, by allowing a certain amount of water to rush through the wheel at that time.

The lever X is pivotally connected to the gate movement stem 55, and to a fixed pivot $X^2$. Rod Z is connected to lever X by a link $Z^2$. This gives a greatly reduced motion to rod Z, in respect to gate movement. Rod Z is supported by suitable keepers $Z^3$ and $Z^4$, and a lever 45 is pivoted to the upper end of rod Z. If the governor balls hold contact $45^a$ at a certain position, at a certain speed, then it can be seen that if the gate moves toward its opening position, the rod Z will raise slightly and lower contact $45^a$, and this will have the tendency of lowering the speed of the wheel. The opposite effect takes place when the gate is moved toward its closing position.

Y is a turn buckle or double threaded nut, which when turned in one direction, lengthens the rod Z, and when turned in the other direction, shortens the rod Z. It will be understood, that when the rod Z is lengthened, it has a tendency to lower the speed. Consequently, if the water wheel and generator, which this governor is governing, is operating in multiple with other synchronous machines, and similar governors, and if rod Z is lengthened, this alternator will at once take less load and will keep on carrying that proportion of its load, as compared with the other machines, until readjusted. The reason that these governors can be made to synchronize, or in other words, equalize their load when operating on alternators running in multiple, is because the gate movement through lever X and rod Z automatically changes the position of contact 45$^a$, so as to have a tendency to lower the speed more on the generator which has the most load, than on the others. The opposite is true when the load is reduced on the generators. When it is desired to have absolutely constant speed from friction load to full load, the link Z$^2$ can be taken off and rod Z bolted securely to keepers Z$^4$ and Z$^3$. In cases where synchronous generators operate in cultiple, it is a known fact that it is desirable to have all the generators decrease in speed about two per cent. from friction load to full load, in order to get the generators to equalize their load. It should be stated here also that irridium has been found most satisfactory for the floating contacts and platinum for the relay contacts, but platinum may also be used for the floating contacts.

*Summary of operation.*—When the water wheel is running at the predetermined desired speed, the contact holder or lever 45 will be held in its intermediate position, the three primary contacts 45$^a$, $t$ and $v$ will be held out of engagement as shown in Fig. 1, and the brake 28 will be held in its intermediate or idle position, out of contact with the rotating friction disks 23 and 27. If the speed of the water wheel increases above the predetermined desired speed, the centrifugally actuated balls 34 will move outward and cause the shaft 37 and contact holder 45 to move downward, thereby moving the intermediate primary contact 45$^a$ into engagement with the lower primary contact $v$, and thus allowing the electricity to flow through the coil or winding $c$. This magnetizes core $o$, lowers armature lever E, and when said armature E is thus lowered by said core, it closes the circuit between contacts J—B, and thus causes the electricity, from the generator 33, to flow through the right hand brake-actuating magnet coil 32, by way of wires $w$ and $h$. As already described, when the right hand brake actuating secondary magnet 32 is energized, the brake 28 is drawn toward the right and, through the differential gate actuating gear, the gate 6 is moved toward its closed position. The water passing to the wheel possesses such inertia that it can not respond quickly to changes in the position of the gate and could not change the speed of the wheel, or rather, bring the speed of the wheel to the predetermined desired speed, before the gate would have passed the correct position for the new "load" and, hence, would produce "racing" of the wheel. This, however, is prevented by the action of the dash pot 54 and piston 56 (of the antiracing device), the former of which is connected to and moves downward with the rack 13, when said rack is moved downward, in the act of closing the gate. This downward movement of the dash pot 54 carries the piston 56 and its rod 57 downward and causes the lower lug 58 to move the lever 49 downward and thereby separate the contact $v$, which it carries, from the intermediate primary contact 45$^a$, before the gate 6 has been moved too far. When the circuit is thus broken between the said contact members $v$ and 45, the coil $c$ is deënergized, the spring G draws the armature E upward, breaking the circuit between the contact J—B, with the result that the right hand brake magnet 32 is deënergized, the brake 28 is thrown into its inoperative intermediate position by its centering device 30—31, and further downward movement of the rack 13 and closing movement of the gate is stopped for the time being. When the downward movement of the rack 13 is thus stopped, further downward movement of the dash pot 54 and piston 56 will also be stopped, for the reason that said dashpot is fixed to or carried by the said rack. When the rack 13 is moved upward, it carries the piston 56 and its stem upward, and causing the upper lug 58 to raise the upper lever 48 and move the contact $t$ out of engagement with the contact lever 45, thereby breaking the circuit at that point, before the gate is moved too far, in the direction of its wide open position. This timely stopping of the upward movement of the rack 13, also, of course, stops further upward movement of the dash pot 54, piston 56 and lever 48, so that the spring 51 (preferably assisted by gravity of the parts) then starts moving the upper lever 48 and contact $t$ downward to its normal position, to-wit, to a position in which said lever engages the stop 52. The pipe valve, so-called, operates the same both under upward and downward movements of the dash pot, or in other words, both under closing and opening movements of the gate 6, except that under the latter the oil finds its free passage through the upper slots 62 of the said pipe valve 59.

When the speed of the water wheel falls below the predetermined desired speed, the centrifugally actuated balls 34 move inward, thereby raising the contact lever 45 and moving the same into engagement with the contact $t$, thereby closing the circuit at that point and causing electricity to flow through the coil or windings $b$. When the coil $b$ is energized, it magnetizes the core $n$, thus causing the armature F, against the action of the left hand spring G, to move downward and close the circuit between the contacts H—A. When the circuit is closed between the contacts H—A electricity from the generator 33 flows through the coil of the left hand brake controlling magnet 32, by way of wires $w$ and $j$. Also, as already described, when the left hand brake-actuating magnet 32 is energized, the brake 28 is moved toward the left, thereby, through the differential gate actuating gear, causing the rack 13 to move upward and the gate 6 to be moved toward its wide open position. Just as soon as the dash pot stops, the action of the spring 51, (assisted preferably by gravity of the parts) starts moving the upper lever 48 downward and continues such movement until it strikes the stop 52. This downward movement of the lever 48, of course, carries the piston 56 downward with it and contacts $t$ and $v$ until they are in their central position. If the contacts $t$ and $v$ should be carried too far away or upward from their normal positions, the piston 56 would pass above the partition 61 of the pipe valve 59, and the oil or other liquid within the dash pot 54 may then flow freely through the upper slots 62, and thus allow the piston to return more freely and quickly to its normal position, to-wit, to a position in which the levers 49 and 48 bear against the stop 52. It will thus be seen that the anti-racing device made up of the dash pot 54 and piston 56 is self adjusting to different positions of the rack 13, and, consequently to different positions of the gate 6. Otherwise stated, after each gate adjusting action, the piston 56 is returned to its centered or normal position with respect to the so-called pipe valve 59 and its partition 61, while the dash pot may assume various different positions in respect to said piston. Stated in another way, if the working load of the water wheel be very light, so that the gate 6 is opened but slightly, dash pot 54 will be in a lowered position, while if the working load on the water wheel is very heavy, so that the gate 6 is wide open or nearly so, said dash pot will be in a raised position with respect to the position shown in the drawings, but the piston 56 will stand in its centered position with respect to the pipe valve 59, in both instances, as long as the predetermined desired speed of the water wheel is maintained.

The expression "gearing" or "power driven gearing" as herein used to designate the mechanism by which the power controlling element of the motor is adjusted, is used in a broad sense and is not limited to bevel gears, spur gears, or any other kind of toothed gears or friction gears.

Fig. 4 shows how the governor can control speed without the use of centrifugal balls or weights. In the diagram view, Fig. 4, the numerals 62, 63, 64, 65 and 66, indicate respectively, the armature, the north and south poles and the slip rings, of a small permanent field alternating generator. This generator however, may be a direct current generator. The generator above described, is driven from the water wheel shaft 5 through the belt 43, which runs over a small pulley on the shaft of the armature 62. The lever 45 which carries the intermediate floating contact, is in this case, intermediately mounted on a fixed pivot, and at its outer end, it carries a core 67. The core 67 has a piston 68 that works in a dash pot 69 for retarding movements of the said core. The cylinder or dash pot 69 has a by-pass 70 that connects the lower and upper ends thereof. A solenoid 71 surrounds the core 67, and the lever 45 is preferably provided with a counter-weight 72. The slip rings 65 and 66 are connected by wires 73 and 74 to the opposite terminals of the solenoid 71 through an electrical resistance or impedance, preferably in the form of a small rheostat, made up of a series of electrically connected contacts 75 and a movable contact 76. In this arrangement, the movable contact 76 is carried by a vertically movable bar 77, the lower end of which in this modified arrangement, is connected to the lever X. This bar 77 is preferably provided with a turn buckle 78, by means of which the movable contact 76 may be adjusted vertically in respect to the lever X.

The operation of this modified construction in so far as it differs from that of the complete apparatus above described, is substantially as follows: If the speed of the water wheel is reduced, the speed of the generator, to-wit, of the armature 62 thereof, will be correspondingly reduced, and the voltage of the said generator is lowered, allowing the core 67 to drop, and this raises the contact $45^a$ until it engages contact $t$, and thereby causes the governor to move the gate of the water wheel in its opening direction. If the speed of the water wheel increases, the speed of the said generator increases, and the increasing voltage thus produced, raises the core 67 and lowers the contact $45^a$ until it engages contact $v$, and this causes the governor to move the water wheel gate in its closing direction. The bar 77 which carries the contact 76 is used for equalizing the load when several alternators are running in multiple, and raises and lowers contact 76 in proportion to the gate movement. On account of the adjustable contact 76 and the coöperating variable resistance devices, when the gate of the water wheel opens, it cuts out more resistance in circuit 73 74, thereby raising core 67 and lowering contact 45ª, and causing the governor to close off the water wheel gate a little, which has a tendency to make the water wheel and the main generator take less load. When the gate closes, it cuts in more resistance, causing the core 67 to drop, and raises the contact 45ª, thereby causing the governor to open the water wheel gate a little more, and this has tendency to make the said main generator take a little more load.

The expression "electrical relay" is herein used to mean an electrical device whereby the opening or closing of one circuit correspondingly opens or closes another and more powerful circuit; and for the sake of definition, the first or relatively weak circuit is herein treated as the controlling circuit and the relatively powerful circuit is treated as the actuating circuit.

What I claim is:

1. The combination with a motor having a speed controlling element, of a controlling circuit, an actuating circuit, an electrical relay whereby opening or closing of said controlling circuit will correspondingly open or close said actuating circuit, means subject to said actuating circuit for adjusting the said speed controlling element of said motor, and means whereby changes in speed of said motor will influence said relay through said controlling circuit, said latter means comprising a generator and a variable resistance in circuit therewith, and connections whereby said variable resistance will be adjusted by movements of the said speed controlling element of said motor.

2. The combination with a motor having a speed controlling element, of a controlling circuit, an actuating circuit, an electrical relay whereby opening or closing of said controlling circuit will correspondingly open or close said actuating circuit, means including magnets in said actuating circuit for adjusting the speed controlling element of said motor, three coöperating contacts for opening and closing said controlling circuit, an electrical generator subject to changes in speed of said motor, an electromagnet and variable resistance in circuit with said generator, connections whereby said latter noted magnet will move one of the said three contacts of said controlling circuit, and connections whereby said variable resistance will be adjusted by movements of the speed controlling element of said motor.

3. The combination with a motor having a speed controlling element, of a controlling circuit, an actuating circuit, an electrical relay whereby opening or closing of said controlling circuit will correspondingly open or close said actuating circuit, means including magnets in said actuating circuit for adjusting the speed controlling element of said motor, three coöperating contacts for opening and closing said controlling circuit, an electrical generator subject to changes in speed of said motor, an electromagnet and variable resistance in circuit with said generator, connections whereby said latter noted magnet will move one of the said three contacts of said controlling circuit, connections whereby said variable resistance will be adjusted by movements of the speed controlling element of said motor, and an anti-racing device adjusted by the speed controlling element of said motor, and in turn, regulating the relative adjustments of the three contacts of said controlling circuits.

In testimony whereof I affix my signature in presence of two witnesses.

JOHN PEARSON.

Witnesses:
H. H. LAGRANDEUR,
ROSE E. LA GRANDEUR.